United States Patent
Dussud

(10) Patent No.: US 8,714,234 B2
(45) Date of Patent: May 6, 2014

(54) SENSOR AND METHOD FOR MEASURING THE SURFACE LEVEL OF A LIQUID PHASE METAL

(75) Inventor: Michel Dussud, Saint Martin en Haut (FR)

(73) Assignee: Avemis (FR)

( * ) Notice: Subject to any disclaimer, the term of this patent is extended or adjusted under 35 U.S.C. 154(b) by 263 days.

(21) Appl. No.: 13/266,866

(22) PCT Filed: Apr. 28, 2010

(86) PCT No.: PCT/FR2010/050810
§ 371 (c)(1),
(2), (4) Date: Oct. 28, 2011

(87) PCT Pub. No.: WO2010/125310
PCT Pub. Date: Nov. 4, 2010

(65) Prior Publication Data
US 2012/0048011 A1    Mar. 1, 2012

(30) Foreign Application Priority Data
Apr. 29, 2009 (FR) ...................................... 09 52849

(51) Int. Cl.
*G01F 23/22*  (2006.01)
(52) U.S. Cl.
USPC ..... 164/151.3; 73/290 R; 73/291; 324/207.13
(58) Field of Classification Search
USPC .......... 73/290 R, 291, 292; 164/151.3, 151.4, 164/154.1, 155.2; 324/207.12, 207.13
See application file for complete search history.

(56) References Cited

U.S. PATENT DOCUMENTS

| 4,075,890 | A | * | 2/1978 | Iwasaki et al. | ................... 73/295 |
| 4,144,756 | A | * | 3/1979 | Linder | .......................... 73/290 R |
| 4,212,342 | A | * | 7/1980 | Linder et al. | ................... 164/453 |
| 4,279,149 | A | * | 7/1981 | Block | ........................... 73/290 R |
| 4,441,541 | A | * | 4/1984 | Block | ............................ 164/453 |
| 4,647,854 | A |   | 3/1987 | Yamada et al. | |

(Continued)

FOREIGN PATENT DOCUMENTS

| GB | 2004373 A | 3/1979 | | |
| JP | 58047548 A | * | 3/1983 | ............. B22D 11/16 |
| JP | 60076262 A | * | 4/1985 | ............. B22D 11/16 |

OTHER PUBLICATIONS

International Search Report issued Sep. 16, 2010 by European Patent Office re: PCT/FR2010/050810; citing: US 4,647,854 A, US 2002/105342 A1 and GB 2 004 373 A1.

*Primary Examiner* — David A Rogers
(74) *Attorney, Agent, or Firm* — Cantor Colburn LLP

(57) ABSTRACT

A sensor for measuring the surface level of a liquid phase metal includes an air excitation coil and lower and upper air reception coils. Excitation coil is perpendicular to an upper surface of an ingot mold and powered by a current for generating a magnetic field. Magnetic field lines propagate along upper field lines away from the ingot mold and along lower field lines covering the upper surface and the molten metal surface. Lower air coil is parallel to the excitation coil, whereby an induced voltage is generated by the lower field lines, the latter being modified by varying the level of the metal surface. Upper air coil is parallel to the excitation coil, vertically adjacent to the lower air coil, with a shape and characteristics identical to the lower air coils. Upper field lines generate the induced voltage and are substantially free of disturbances generated by the metal surface.

13 Claims, 2 Drawing Sheets

(56) References Cited

U.S. PATENT DOCUMENTS

| | | | |
|---|---|---|---|
| 4,708,191 A * | 11/1987 | Block et al. | 164/151.3 |
| 5,103,893 A * | 4/1992 | Naganuma et al. | 164/451 |
| 6,337,566 B1 * | 1/2002 | Fujisaki et al. | 324/207.17 |
| 6,494,249 B1 * | 12/2002 | Kollberg et al. | 164/452 |
| 6,577,118 B2 * | 6/2003 | Parent et al. | 324/204 |
| 7,024,932 B2 * | 4/2006 | Nicolazo de Barmon et al. | 73/290 V |
| 2002/0105342 A1 | 8/2002 | Parent et al. | |

* cited by examiner

SENSOR AND METHOD FOR MEASURING THE SURFACE LEVEL OF A LIQUID PHASE METAL

TECHNICAL FIELD

The present invention relates to a sensor for measuring the level of metal in a continuous casting ingot mold.

BACKGROUND

The continuous casting metallurgical method provides for casting the molten metal at a temperature of around 1500° C. in a bottomless mold. The shape of the ingot mold determines the section of the ingot which is extruded continuously.

A critical parameter of this method is the level of the molten metal in the ingot mold.

The monitoring of the molten metal level can be done conventionally by a suspended electromagnetic sensor as is shown, for example, by the document U.S. Pat. No. 4,647,854.

This type of sensor has two or three separate and independent coils which are all parallel to the molten metal surface. A first coil has an excitation function; the second and the third coil have a measurement function and are positioned on either side of the excitation coil.

The operating principle of this type of sensor consists in causing an alternating electrical signal to flow in the excitation coil, generated by control electronics, which creates a magnetic field.

This magnetic field is more or less disturbed depending on the level of molten metal present in the ingot mold.

Since the magnetic field varies according to the molten metal level, the voltage induced in the measurement coil which is adjacent to the molten metal is representative of the level of metal in the ingot mold.

The induced voltage which passes through the measurement coil adjacent to the molten metal is compared to the induced voltage which passes through the opposite, and therefore undisturbed, measurement coil, which makes it possible to deduce the liquid metal level from the difference between these two induced voltages.

In practice, the electromagnetic sensors are suspended above the molten metal, notably to avoid edge effects.

The positioning of these sensors above the molten metal considerably hampers interventions by the operators on the casting. These operators in fact have to constantly check the "cleanliness" of the surface of the molten metal and are required to intervene on the surface of the molten metal.

Furthermore, when changing the tube which feeds the molten metal into the ingot mold from a pocket situated upstream of the ingot mold, the sensor has to be purely and simply removed from the ingot mold.

BRIEF SUMMARY

In this technical context, one aim of the invention is to propose an electromagnetic molten metal measurement sensor for a continuous casting ingot mold, which can be remotely sited from the casting surface and which is largely insensitive to the electromagnetic and thermal disturbances.

The invention relates to a sensor for measuring the level of the surface of a liquid phase metal for a continuous casting plant that includes an ingot mold having an upper face into which an opening, into which the liquid metal is fed, leads.

Furthermore, the sensor comprises:
an air, or magnetic flux, excitation coil perpendicular to the upper face of the ingot mold powered by a current to create a magnetic field whose field lines are propagated along upper field lines which move away from the ingot mold and along lower field lines which cover the upper face of the ingot mold and the molten metal surface, and
a lower air, or magnetic flux, reception coil parallel to the excitation coil in which an induced voltage is generated by the action of the lower field lines, the latter being likely to be modified by a variation of the level of the molten metal surface, and
an upper air, or magnetic flux, reception coil parallel to the excitation coil, and directly superposed on the lower reception coil, and with geometry and characteristics identical thereto, in which an induced voltage is generated by the action of the upper field lines, the latter being substantially free of disturbances generated by the molten metal surface,
the sensor being designed to be positioned on the upper face of the ingot mold in proximity to the opening.

The invention thus proposes a measurement sensor that has an original architecture which makes it possible to position this sensor permanently on the ingot mold, at the edge of the liquid metal. Although not directly above the liquid metal as in the conventional case, the sensor according to the invention provides a level measurement for the molten metal. This is made possible by virtue of the arrangement whereby the excitation and reception coils are oriented in planes perpendicular to the surface of the liquid metal. Thus, the sensor according to the invention uses a magnetic field which is parallel to the surface of the liquid metal to be measured.

Furthermore, the sensor according to the invention is provided with air coils, that is to say, coils which do not use any ferromagnetic core. This arrangement is important to the quality of the measurement because the ferromagnetic cores that are used in the conventional sensors are sensitive to the temperature variations and to the electromagnetic disturbances; they exhibit a hysteresis which makes modelling their behavior extremely difficult. The sensor according to the invention therefore has an immunity with regard to the disturbances and magnetic and thermal variations.

Preferably, the upper reception coil and the lower reception coil are juxtaposed with the excitation coil. This arrangement makes it possible to obtain a compact sensor, which makes it less of a disturbing factor.

According to one arrangement of the invention, the lower reception coil and the upper reception coil are positioned symmetrically relative to the plane of symmetry of the excitation coil.

In practice, the sensor comprises an amagnetic and electrically insulating core on which are wound electric wires forming the excitation coil and the two reception coils.

Provision is made for the core to have a groove in which is helically wound an electric wire forming the excitation coil and two superposed grooves having axes parallel to one another and parallel to the axis of the groove receiving the excitation coil in each of which is helically wound an electric wire forming a reception coil.

In order to simplify manufacture, provision may be made for the core to comprise two superposed sub-parts each comprising a groove for a reception coil and a half-groove for an excitation coil.

In practice, each of the grooves has a substantially rectangular profile.

Furthermore, the sensor has a housing intended to protect the coils and the means for electrical connection to the coils.

In order to minimize the magnetic field losses by eddy current, the upper and lower walls and the front wall of the housing are made of a material with high electrical resistivity.

As a variant, in order to orient the magnetic field, the sensor may be equipped with plates with low electrical resistivity which line its lower and upper walls.

Provision is made for the sensor to incorporate a cooling circuit.

According to one possibility, the measurement sensor can be linked to a temperature measurement probe positioned in proximity to the opening and intended to measure the temperature of the copper plate of the ingot mold. This measurement can be used to compensate the signal drifts of the sensor linked to the temperature variations in the wall of the ingot mold. The temperature probe can be positioned in the wall of the ingot mold.

According to another aspect, the invention relates to a method for measuring the level in a continuous casting plant having an ingot mold having an upper face into which an opening, into which the liquid metal is fed, leads, characterized in that the method comprises steps comprising:
- applying a voltage to an air excitation coil perpendicular to the upper face of the ingot mold and positioned in proximity to the opening, to create a magnetic field whose field lines are propagated along upper field lines which move away from the ingot mold and along lower field lines which cover the upper face of the ingot mold and the molten metal surface;
- measuring an induced voltage generated by the action of the lower field lines, the latter being likely to be modified by a variation of the level of the molten metal surface, in a lower air reception coil parallel to the excitation coil;
- measuring an induced voltage generated by the action of the upper field lines, the latter being substantially free of disturbances generated by the molten metal surface, in an upper air reception coil parallel to the excitation coil, and superposed on the lower reception coil and with a geometry and characteristics identical thereto;
- comparing and digitally processing the induced voltages measured in the lower and upper reception coils to obtain a value of the molten metal level in the ingot mold;
- measuring the temperature of the ingot mold;
- correcting, by digital processing, the value of the molten metal level according to the temperature of the ingot mold.

The invention provides for a level measurement to be performed from the ingot mold which can have an influence on the quality of the measurement. To neutralize the influence of the temperature variations of the ingot mold, the invention provides for this temperature to be measured and for the measurement of the molten metal level to be corrected according to the temperature.

As a variant, a step may be provided for correcting, by digital processing, the value of the molten metal level according to the width of the ingot mold.

BRIEF DESCRIPTION OF THE DRAWINGS

For a good understanding of it, the invention is described with reference to the appended drawing representing, as a nonlimiting example, one embodiment of a measurement sensor according to the invention.

DETAILED DESCRIPTION

Figure 1:
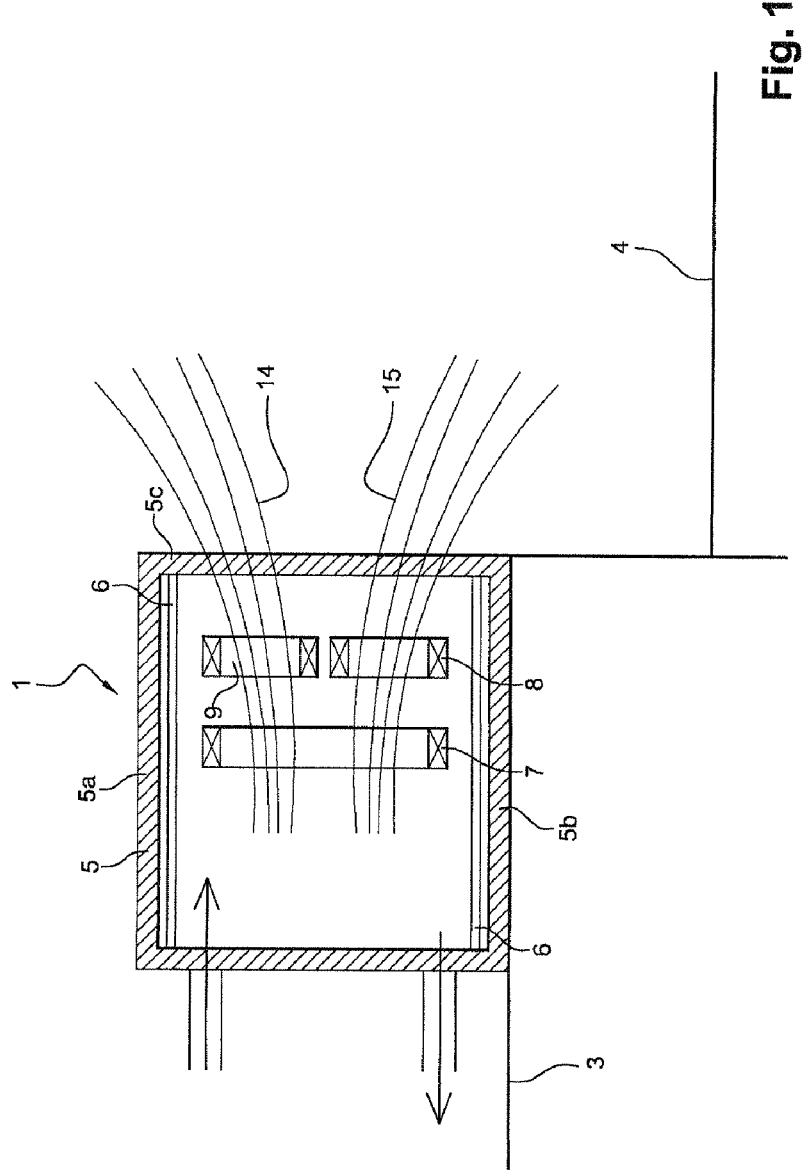
FIG. 1 schematically represents a measurement sensor positioned on a partially represented ingot mold.

A partially represented ingot mold can be seen in FIG. 1. Conventionally, the ingot mold has an upper face 3 and an opening 4 whose transversal cross section determines the section of the ingot which is obtained from the ingot mold 2.

The liquid metal is introduced through a feed tube (not represented) into the opening 4 of the ingot mold 2 and the level should be measured continuously in order to monitor the liquid metal feed flow rate.

The sensor 1, as can be seen in FIG. 1, is positioned in proximity to the opening 4. In other words, the sensor 1 is placed on the edge of the opening 4 but is not directly above the opening 4.

The sensor includes a housing 5 which may be made of ceramic or metal. As is shown in FIG. 1, the device may include a lining of plates 6, for example, of copper on its upper 5a and lower 5b internal walls which provide a magnetic shielding. In another embodiment of the invention, directly producing the upper 5a and lower 5b walls of the housing in a material providing a magnetic shielding is considered.

On the other hand, the front face of the housing (that is to say, the face which is positioned adjacent to the opening 4 of the ingot mold) may preferably be made of a metal with very high electrical resistivity.

Figure 3:
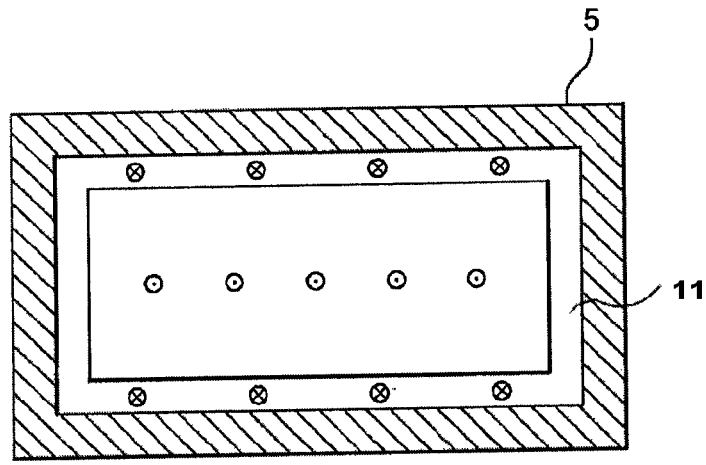
FIGS. 3 and 4 show, in cross section, cooling channels for the sensor.
Figure 4:
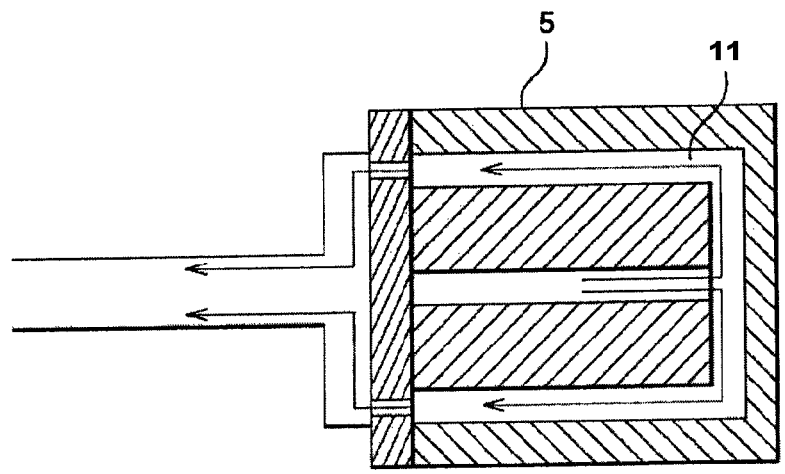

The housing 5 may be equipped with a water or air cooling system given the high temperature around the sensor. FIGS. 3 and 4 show a cooling circuit comprising a number of channels 11 formed in the housing 5 in which a cooling fluid circulates.

The housing 5 can be fixed to the ingot mold by shackles or screws. Unlike the conventional sensors, the sensor according to the invention is intended to be permanently positioned on the ingot mold.

Inside its housing 5, the sensor 1 is provided with three coils which are perpendicular to the upper face of the ingot mold and which are therefore also in planes perpendicular to the surface of the liquid metal.

One of the coils is an excitation coil 7 which is therefore perpendicular to the upper face of the ingot mold. The excitation coil 7 comprises a helical winding of a conductive wire and is passed through by a low-frequency electrical current at around 400 to 1200 Hz.

The other two coils are reception coils which are superposed in the form of a lower reception coil 8 and an upper reception coil 9.

The lower reception coil 8 and the upper reception coil 9 are positioned symmetrically relative to the plane of symmetry of the excitation coil 7.

Figure 2:
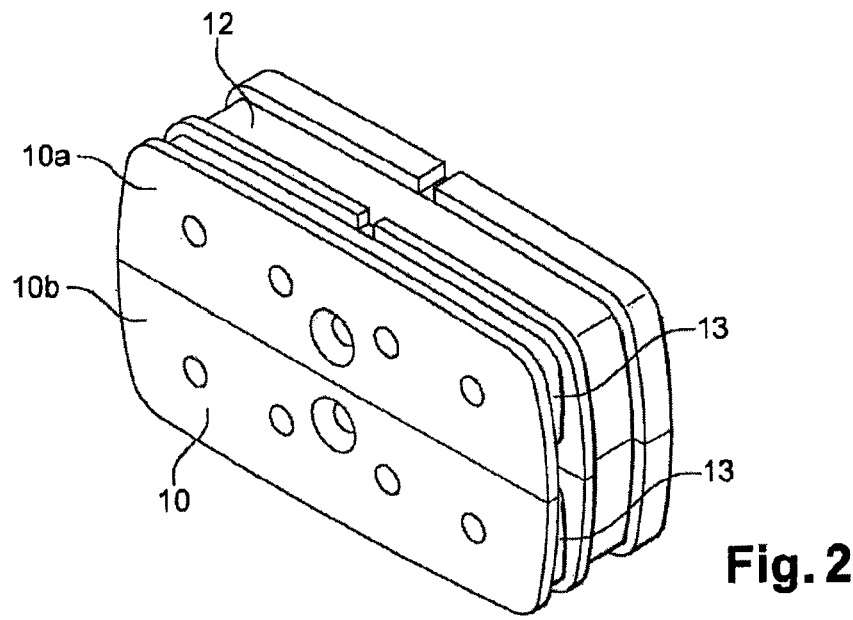
FIG. 2 shows, in perspective, a core belonging to the measurement sensor.

For reasons of clarity for FIG. 1, this figure does not show the core 10 on which the excitation and reception coils are wound. The core 10 is specifically represented in FIG. 2.

In practice, the core 10 has a groove 12 in which is helically wound an electric wire forming the excitation coil 7 and two superposed grooves 13 having axes parallel to one another and parallel to the axis of the groove 12 receiving the excitation coil in each of which is helically wound an electric wire forming a reception coil.

It can be seen that each of the grooves 12 and 13 has a substantially rectangular profile.

To simplify its manufacture, the core may comprise two superposed sub-parts 10a, 10b each including a groove for a reception coil and a half-groove 12 for an excitation coil.

The core 10 is made of an amagnetic and electrically insulating material such as a ceramic or a plastic material resistant to the high temperatures.

In operation, the excitation coil 7 which is passed through by a current creates a magnetic field inside and outside the coil.

Upper field lines 14 are diffused by moving away from the ingot mold and through the upper reception coil 9; on the other hand, lower field lines 15 irrigate the ingot mold and, in particular, the part of the ingot mold 2 containing the surface of the molten metal, and diffuse through the lower reception coil 8.

As is represented in FIG. 1 by dotted lines, the level variations of the molten metal disturb the lower field lines which is translated into a voltage variation induced in the lower reception coil 8.

The lower and upper reception coils 8 and 9 are linked to an electronic processing unit in which the induced voltages are processed, amplified and compared.

By comparison with the induced voltage in the upper coil 9, it is then possible to determine the liquid metal level in the ingot mold. The original arrangement of the excitation coil and of the reception coils makes it possible to position the sensor on the ingot mold at the rim of the casting opening.

Providing the sensor according to the invention with a temperature probe can also be considered. This temperature probe is preferably positioned in immediate proximity to the opening 4 or in the wall of the ingot mold.

This thermocouple or thermistance-type temperature probe is linked to the electronic processing unit to integrate the data concerning the temperature and, possibly, compensate the measurement drifts linked to the temperature variations in the wall of the ingot mold.

Obviously, the invention is not limited to the embodiment described above by way of nonlimiting example but, on the contrary, it encompasses all the embodiments.

The invention claimed is:

1. A sensor for measuring a level of a surface of a liquid phase metal for a continuous casting plant that includes an ingot mold having an upper face into which an opening, into which the liquid metal is fed, leads, the sensor comprising:
    an air excitation coil perpendicular to the upper face of the ingot mold, powered by a current to create a magnetic field whose field lines are propagated along upper field lines which move away from the ingot mold and along lower field lines which cover the upper face of the ingot mold and the molten metal surface,
    a lower air reception coil parallel to the excitation coil in which an induced voltage is generated by action of the lower field lines, the latter being modified by a variation of the level of the molten metal surface, and
    an upper air reception coil parallel to the excitation coil, and directly superposed on the lower reception coil, and with geometry and characteristics identical thereto, in which an induced voltage is generated by the action of the upper field lines, the latter being substantially free of disturbances generated by the molten metal surface,
    wherein the sensor is designed to be positioned on the upper face of the ingot mold in proximity to the opening.

2. The level measurement sensor as claimed in claim 1, wherein the upper reception coil and the lower reception coil are juxtaposed with the excitation coil.

3. The level measurement sensor as claimed in claim 1, wherein the lower reception coil and the upper reception coil are positioned symmetrically relative to the plane of symmetry of the excitation coil.

4. The measurement sensor as claimed in claim 1, wherein the sensor is equipped with plates with high magnetic resistivity which line the lower and upper walls.

5. The measurement sensor as claimed in claim 1, wherein it is linked to a temperature measurement probe positioned in proximity to the opening.

6. The measurement sensor as claimed in claim 1, wherein it is linked to a temperature probe positioned in the wall of the ingot mold.

7. The measurement sensor as claimed in claim 1, further comprising a cooling circuit.

8. The measurement sensor as claimed in claim 1, further comprising a housing intended to protect the coils and the means for electrical connection to the coils.

9. The measurement sensor as claimed in claim 8, wherein the upper and lower walls and the front wall of the housing are made of a material with high electrical resistivity.

10. The level measurement sensor as claimed in claim 1, further comprising an a magnetic and electrically insulating core on which are wound electric wires forming the excitation coil and the two reception coils.

11. The measurement sensor as claimed in claim 10, wherein the core has a groove in which is helically wound an electric wire forming the excitation coil and two superposed grooves having axes parallel to one another and parallel to the axis of the groove receiving the excitation coil in each of which is helically wound an electric wire forming a reception coil.

12. The measurement sensor as claimed in claim 10, wherein the core comprises two superposed sub-parts each comprising a groove for a reception coil and a half-groove for an excitation coil.

13. The measurement sensor as claimed in claim 12, wherein each of the grooves has a substantially rectangular profile.

* * * * *